(12) United States Patent
Guen (10) Patent No.: US 10,193,131 B2
(45) Date of Patent: Jan. 29, 2019

(54) RECHARGEABLE BATTERY

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 66 days.

(21) Appl. No.: 15/231,598

(22) Filed: Aug. 8, 2016

(65) Prior Publication Data

US 2017/0170450 A1   Jun. 15, 2017

(30) Foreign Application Priority Data

Dec. 14, 2015   (KR) .................. 10-2015-0178135

(51) Int. Cl.
| | |
|---|---|
| *H01M 2/08* | (2006.01) |
| *H01M 2/34* | (2006.01) |
| *H01M 2/04* | (2006.01) |
| *H01M 2/36* | (2006.01) |

(52) U.S. Cl.
CPC ......... *H01M 2/365* (2013.01); *H01M 2/0456* (2013.01); *H01M 2/08* (2013.01); *H01M 2/34* (2013.01)

(58) Field of Classification Search
None
See application file for complete search history.

(56) References Cited

U.S. PATENT DOCUMENTS

| | | |
|---|---|---|
| 6,190,798 B1 | 2/2001 | Okada et al. |
| 2005/0221174 A1 | 10/2005 | Yoon |
| 2009/0136841 A1 | 5/2009 | Watanabe et al. |
| 2010/0159320 A1* | 6/2010 | Kim ............. H01M 2/361 429/178 |
| 2012/0258355 A1 | 10/2012 | Guen |

FOREIGN PATENT DOCUMENTS

| | | |
|---|---|---|
| EP | 1840985 A2 | 10/2007 |
| JP | 02-090455 | 3/1990 |
| JP | 2013-20730 A | 1/2013 |
| KR | 10-2006-0088312 | 8/2006 |
| KR | 10-2006-0106372 A | 10/2006 |
| KR | 10-2012-0113556 A | 10/2012 |
| KR | 10-1308311 | 9/2013 |

OTHER PUBLICATIONS

English Abstract of KR 2008-0013212 A, dated Feb. 13, 2008, also published as KR 10-1308311, listed above, 1 page.
EPO Extended Search Report dated Jan. 20, 2017, for corresponding European Patent Application No. 16190148.3 (11 pages).

* cited by examiner

*Primary Examiner* — Daniel S Gatewood
(74) *Attorney, Agent, or Firm* — Lewis Roca Rothgerber Christie LLP (57) ABSTRACT

A rechargeable battery includes an electrode assembly; a case accommodating the electrode assembly; a cap plate covering the case and including an injection hole sealed by a ball; and a terminal plate covering the injection hole and the ball.

11 Claims, 7 Drawing Sheets

RECHARGEABLE BATTERY

CROSS-REFERENCE TO RELATED APPLICATION

This application claims priority to and the benefit of Korean Patent Application No. 10-2015-0178135 filed on Dec. 14, 2015 in the Korean Intellectual Property Office, and all the benefits accruing therefrom under 35 U.S.C. 119, the entire content of which is herein incorporated by reference.

BACKGROUND

1. Field

The present invention relates to a rechargeable battery.

2. Description of the Related Art

In general, rechargeable batteries that can be reused by being repeatedly charged serve as a power supply for mobile devices or for driving a motor of a hybrid vehicle or an electric vehicle, and the like. Each rechargeable battery typically includes an electrode assembly and a case accommodating the electrode assembly. The rechargeable batteries may be classified into a prismatic type, a pouch type, and a cylindrical type depending on the type of case used and the electrode assembly positioned in the case may be classified into a winding type and a stacking type depending on the structure of the electrode assembly accommodated therein.

SUMMARY

Embodiments of the present invention provide a rechargeable battery, which includes a terminal plate coupled to an injection hole to enable triple sealing without a separate seal-pin and has an improved mechanical strength between the injection hole and the terminal plate.

The above and other aspects of the present invention will be described in or be apparent from the following description of exemplary embodiments.

According to an aspect of the present invention, there is provided a rechargeable battery including an electrode assembly, a case accommodating the electrode assembly with an electrolyte solution, a cap plate covering the case and including an injection hole closed by a ball, and a terminal plate covering the injection hole and the ball.

The terminal plate may be welded to a region of the cap plate outside the injection hole.

The cap plate may include a first surface that is planar and faces the electrode assembly, a second surface that is planar, opposite to the first surface and faces the terminal plate, a first protrusion part protruding from the first surface toward the electrode assembly, and a second protrusion part protruding from the second surface toward the terminal plate.

The injection hole may include a throughhole centrally formed in the first protrusion part, and a recess formed in the second surface and connected to the throughhole.

The ball may be coupled to the throughhole.

The terminal plate may include a planar first region being in contact with a bottom surface of the recess, a slanted second region extending from the first region and being in contact with side surfaces of the recess, a planar third region extending from the second region and being in contact with the second surface of the cap plate, a slanted fourth region extending away from the third region and the second surface of the cap plate, a planar fifth region extending from the fourth region and welded to a bus bar, a planar sixth region extending from the fifth region and getting closer to the second surface of the cap plate, and a planar seventh region extending from the sixth region and being in contact with the second surface of the cap plate.

Groove may be formed in the seventh region of the terminal plate and the second protrusion part of the cap plate may be coupled to the groove.

The seventh region of the terminal plate may be welded to the second protrusion part.

The third region of the terminal plate may be welded to one region of the second surface of the cap plate.

The space may be defined by fourth, fifth and sixth regions of the terminal plate.

The ball may include a metal core and a resin coated on a surface of the metal core.

As described above, the rechargeable battery according to an embodiment of the present invention includes a terminal plate coupled to an injection hole to enable triple sealing without a separate seal-pin and has an improved mechanical strength between the injection hole and the terminal plate.

For example, the injection hole may be primarily sealed by the ball, secondarily sealed by a welded region between the terminal plate and the cap plate, and thirdly sealed by a contact region between the terminal plate and the cap plate, thereby enabling triple sealing of the injection hole and ultimately demonstrating improved sealing performance.

In addition, since the injection hole can be completely covered by the terminal plate, mechanical strength of the injection hole can be increased.

Moreover, since the injection hole and the terminal plate may be formed to spatially overlap each other in a region, space utilization efficiency of the rechargeable battery can be improved.

BRIEF DESCRIPTION OF THE DRAWINGS

The above and other features of the present invention will become more apparent by describing in detail exemplary embodiments thereof with reference to the attached drawings in which.

DETAILED DESCRIPTION

Hereinafter, examples of embodiments of the invention will be described in detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the drawings, the thickness of layers and regions may be exaggerated for clarity. Like numbers refer to like elements throughout. As used herein, the term "and/or" includes any and all combinations of one or more of the associated listed items. It will also be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise/include" and/or "comprising/including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "lower," "upper," and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1A:
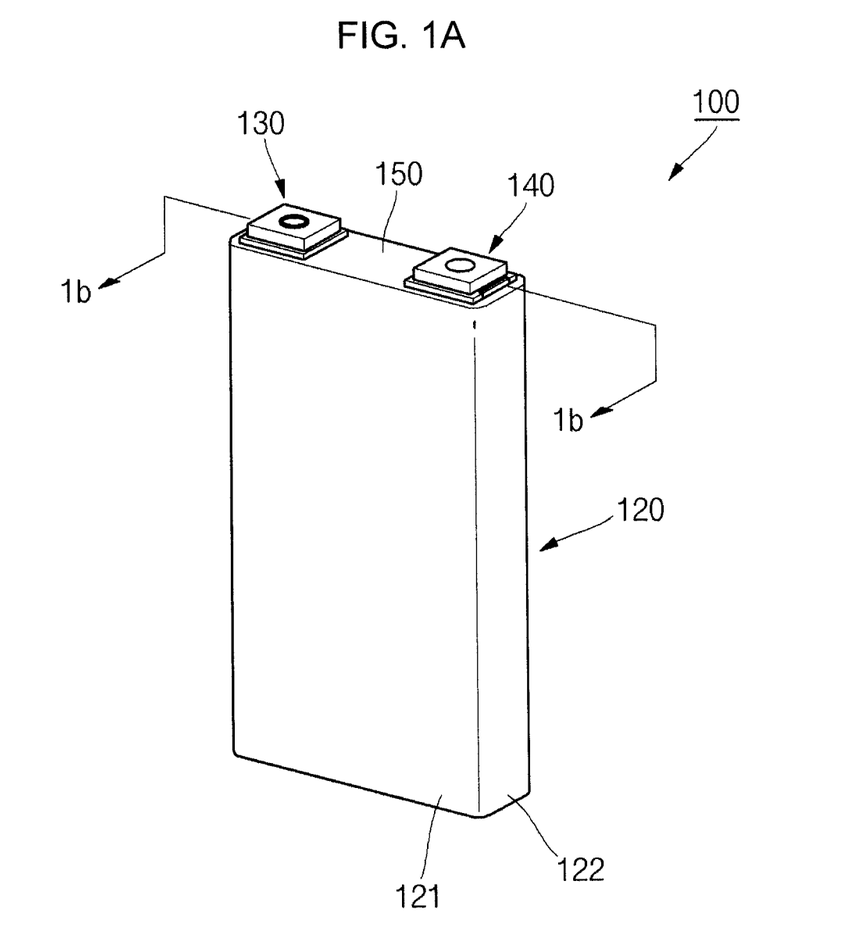
FIGS. 1A and 1B are respectively a perspective view and a cross-sectional view of a rechargeable battery according to an embodiment of the present invention.
Figure 1B:
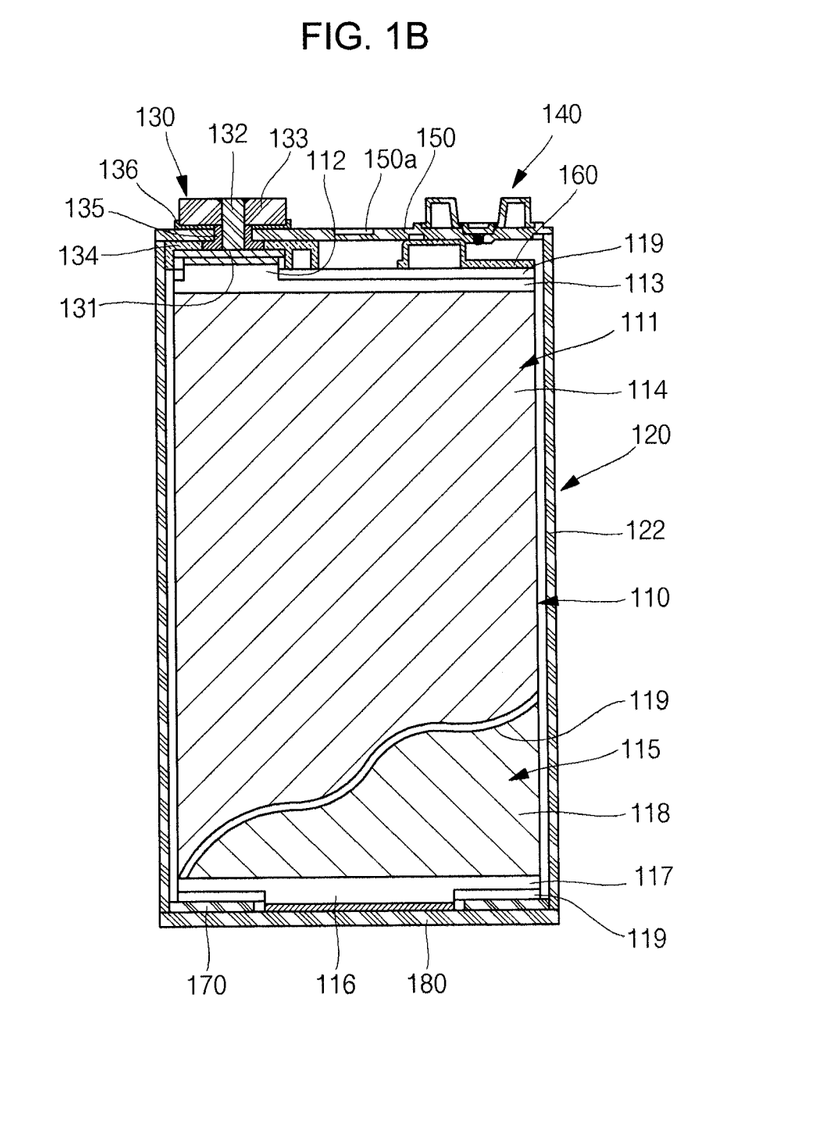

FIGS. 1A and 1B are a perspective view and a cross-sectional view of a rechargeable battery according to an embodiment of the present invention.

Referring to FIGS. 1A and 1B, the rechargeable battery 100 according to an embodiment of the present invention includes an electrode assembly 110, a case 120, a first terminal 130, a second terminal 140, a first cap plate 150, a first retainer 160, a second retainer 170, and a second cap plate 180.

The electrode assembly 110 may include a first uncoated portion 112 extending in a first direction (e.g., upward), and a second uncoated portion 116 extending in a second direction opposite to the first direction (e.g., downward). The electrode assembly 110 may include a pair of electrode assemblies positioned to be parallel with each other, and the pair of electrode assemblies 110 may include a first uncoated portion 112 extending in a first direction and a second uncoated portion 116 extending in a second direction, respectively.

One of the pair of electrode assemblies 110 will be described in more detail.

The electrode assembly 110 may include a first electrode plate 111, a first uncoated portion 112 extending from the first electrode plate 111 in a first direction, a second electrode plate 115, a second uncoated portion 116 extending from the second electrode plate 115 in a second direction, and a separator 119 located between the first and second electrode plates 111 and 115.

The first electrode plate 111 may be formed by coating a first active material 114, such as graphite or carbon, on a first current collector 113 formed of a metal foil made of copper or nickel, and may include a first uncoated portion 112 of the first current collector 113 (that is, a region that is not coated with the first active material 114), which extends and protrudes towards the first terminal 130. The extended and protruded first uncoated portion 112 may be defined as a first tab. The first uncoated portion 112 may be aligned in a predetermined position through a winding process for fabricating the electrode assembly 110, thereby constituting a multi-tab structure. The first uncoated portion 112 is electrically connected to the first terminal 130 to serve as a path for the flow of current between the first electrode plate 111 and the first terminal 130.

The second electrode plate 115 may be formed by coating a second active material 118, such as a transition metal oxide, on a second current collector 117 formed of a metal foil made of aluminum, and may include a second uncoated portion 116 of the second current collector 117 (that is, a region that is not coated with the second active material 118), which is extended and protruded toward the second cap plate 180. The extended and protruded second uncoated portion 116 may be defined as a second tab. The second uncoated portion 116 may be aligned in a predetermined position through a winding process for fabricating the electrode assembly 110, thereby constituting a multi-tab structure. The second uncoated portion 116 is electrically connected to the second cap plate 180, so that it may become a path for the flow of current between the second electrode plate 115 and the second terminal 140.

The separator 119 may be located between the first electrode plate 111 and the second electrode plate 115 to prevent an electrical short from occurring therebetween and to allow lithium ions to move. Since the separator 119 has a slightly larger width than the first electrode plate 111 and the second electrode plate 115, it may protrude farther than the first electrode plate 111 and the second electrode plate 115 in the first and second directions (that is, upward and downward on the page), respectively. Therefore, the separator 119 may prevent the first electrode plate 111 and the second electrode plate 115 from being brought into direct contact with the case 120, the first cap plate 150 and/or the second cap plate 180 in the first and second directions of the electrode assembly 110.

In such a manner, the first electrode plate 111 may function as a negative electrode and the second electrode plate 115 may function as a positive electrode, or vice versa.

In addition, the electrode assembly 110 may include at least one to four electrode assemblies which are positioned to be parallel with one another and stacked together.

The case 120 accommodates the electrode assembly 110 together with an electrolyte solution. In other words, the case 120 may have a pair of long sides 121 facing each other, and a pair of short sides 122 connected to the long sides 121 and facing each other to define a space therein. Therefore, the hexahedral electrode assembly 110 may be accommodated within the case 120. The case 120 may be formed of a conductive metal, such as aluminum, an aluminum alloy or nickel plated steel and may also be defined as a can. Top and bottom ends of the case 120 can be eventually closed by the first cap plate 150 and the second cap plate 180.

A lower region of the first terminal 130 may be connected to the first uncoated portion 112 and an upper region of the first terminal 130 may be extended to the outside of the case 120. In other words, the first terminal 130 may be coupled to the first cap plate 150 in an insulated state, the first uncoated portion 112 may be connected to the lower region of the first terminal 130, the upper region of the first terminal 130 may be positioned on the first cap plate 150 in a substantially hexahedral shape. In one embodiment, the first terminal 130 may include a lower terminal plate 131, a conductive pin 132, and an upper terminal plate 133. The lower terminal plate 131 may be electrically connected to the first uncoated portion 112 and may be coupled to the conductive pin 132. In addition, the lower terminal plate 131 may be electrically insulated from the first cap plate 150 by the lower insulation member 134. The conductive pin 132 may extend up through the first cap plate 150 and may be riveted after it is coupled to the upper terminal plate 133. In one embodiment, the conductive pin 132 may be covered by the seal gasket 135 to then be insulated from the first cap plate 150. In addition, the upper terminal plate 133 may be insulated from the first cap plate 150 by the upper insulation member 136. In embodiments, the lower terminal plate 131 may be made of copper or nickel, the upper terminal plate 133 may be made of aluminum or an aluminum alloy, and the conductive pin 132 may be made of copper, nickel, aluminum or an aluminum alloy.

The second terminal 140 may be positioned at a region spaced from the first terminal 130. In detail, the second terminal 140 may have a similar shape to the first terminal 130 and may be electrically connected to the first cap plate 150. In embodiments, the second terminal 140 may be connected to the first cap plate 150 by ultrasonic welding, laser welding or spot welding. The second terminal 140 may be made of aluminum or an aluminum alloy.

In an embodiment of the present invention, the first terminal 130 may be electrically insulated from the first cap plate 150, while the second terminal 140 may be electrically connected to the first cap plate 150.

The first cap plate 150 may close the case 120 in the first direction, the first terminal 130 may be coupled thereto in an insulated state, and the second terminal 140 may be electrically coupled thereto. For example, the first cap plate 150 may be ultrasonic-, laser- or spot-welded to a top end of the case 120, thereby closing a top portion of the case 120 and allowing the first terminal 130 and the second terminal 140 to be positioned in a more secure manner. The first cap plate 150 may comprise substantially the same material as the case 120, for example, a conductive metal, such as aluminum, an aluminum alloy or nickel plated steel. In addition, the first cap plate 150 may further include a safety vent 151 formed at approximately a central region and having a relatively small thickness, wherein the safety vent 151 is configured to rupture to release internal gases when the internal pressure of the case 120 rises due to overcharging.

The first retainer 160 is positioned between the electrode assembly 110 and the first cap plate 150 to prevent the electrode assembly 110 from excessively moving up and down within the case 120. The first retainer 160 may be made of a material that does not react with an electrolyte solution, the material selected from the group consisting of polypropylene, polyethylene, ethylene propylene diene monomer (EPDM) rubber and equivalents thereof, but aspects of the present invention are not limited thereto. In addition, the first retainer 160 may be elastically positioned between the electrode assembly 110 and the first cap plate 150, such as by being folded multiple times.

The second retainer 170 may be installed between the electrode assembly 110 and the second cap plate 180. Because the second retainer 170 is installed between the electrode assembly 110 and the second cap plate 180, it may prevent an electric short from occurring between the electrode assembly 110 and the second cap plate 180. In one embodiment, a throughhole may be formed in the second retainer 170 to allow the second uncoated portion 116 to pass through the throughhole. The second retainer 170 may be made of a material selected from the group consisting of polypropylene, polyethylene, EPDM rubber and equivalents thereof, but aspects of the present invention are not limited thereto.

The second cap plate 180 may close the case 120 in the second direction and may cover the second retainer 170. In other words, the second cap plate 180 is ultrasonic-, laser- or spot-welded to a bottom end of the case 120, thereby closing a bottom portion of the case 120. The second cap plate 180 may be basically made of the same material as the case 120, for example, a conductive metal, such as aluminum, an aluminum alloy or nickel plated steel.

In one embodiment, the first cap plate 150 may further include an injection hole 155 for injecting an electrolyte solution. The injection hole 155 may be sealed by a ball 156. Additionally, the injection hole 155 and the ball 156 may further be sealed by the second terminal 140. In other words, the injection hole 155 may be primarily sealed by the ball 156, secondarily sealed by a welded region 143a of the second terminal 140, and then thirdly sealed by the second terminal 140 positioned on the first cap plate 150.

Therefore, the rechargeable battery 100 according to the present invention is configured such that the second terminal 140 and the injection hole 155 of the first cap plate 150 are coupled to each other, thereby providing the rechargeable battery 100 enabling triple sealing without a separate sealpin, unlike in the conventional rechargeable battery, and having an improved mechanical strength.

Hereinafter, coupling relationships and assembling methods of the second terminal 140 (to be referred to as a terminal plate), the first cap plate 150 (to be referred to as a cap plate 150) and the injection hole 155 will be described in more detail.

Figure 2A:
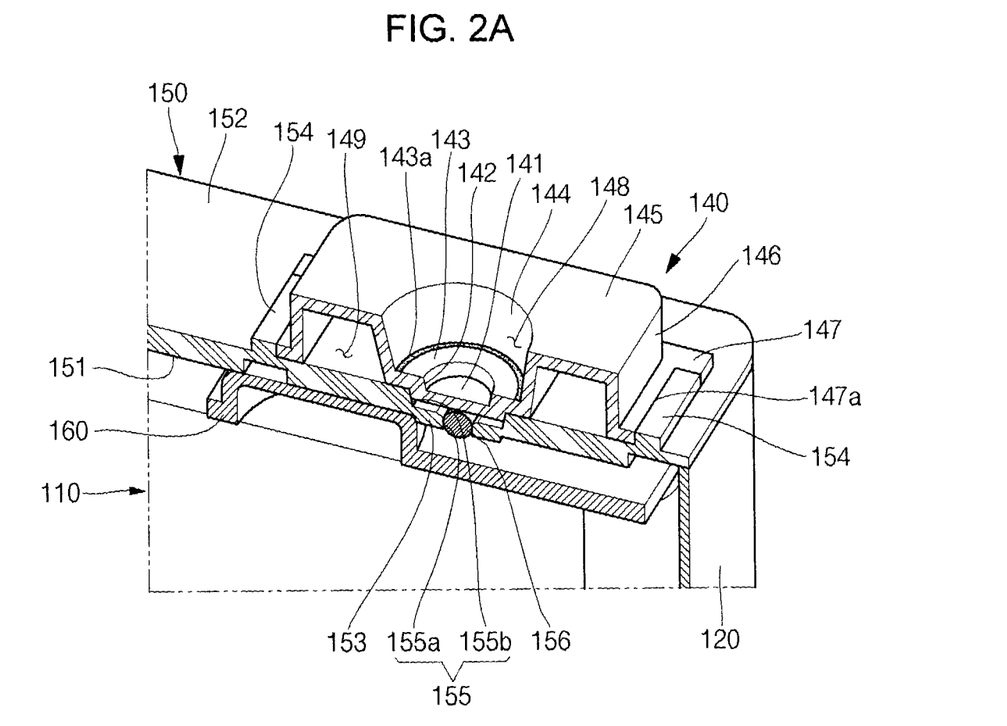
FIGS. 2A and 2B are respectively a perspective and a planar cross-sectional view illustrating a terminal plate and an injection hole of the rechargeable battery illustrated in FIGS. 1A and 1B.
Figure 2B:
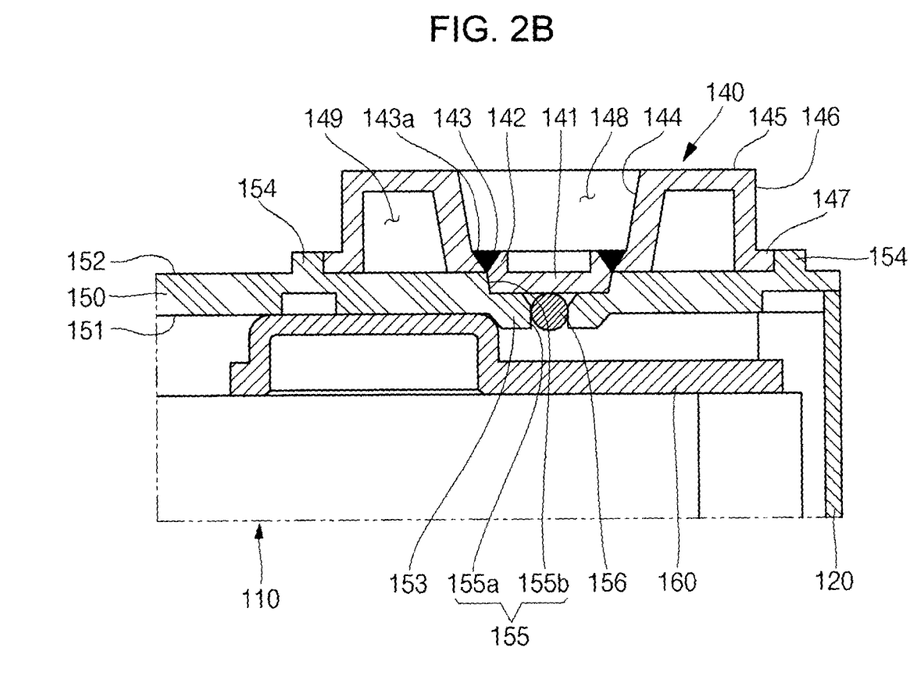

FIGS. 2A and 2B are cross-sectional views illustrating a terminal plate 140 and an injection hole 155 of the rechargeable battery 100 illustrated in FIGS. 1A and 1B.

As illustrated in FIGS. 2A and 2B, the rechargeable battery 100 according to an embodiment of the present invention includes the cap plate 150, which includes the injection hole 155 and the ball 156 coupled to the injection hole 155. In addition, the rechargeable battery 100 according to an embodiment of the present invention is configured such that the injection hole 155 and the ball 156 are covered by the terminal plate 140.

In one embodiment, the terminal plate 140 is welded to a region of the cap plate 150 outside the injection hole 155, thereby fixing the terminal plate 140 to the cap plate 150.

The cap plate 150 includes a substantially planar first surface 151 facing the electrode assembly 110 and a substantially planar second surface 152 opposite to the first surface 151 and facing the terminal plate 140. In addition, the cap plate 150 includes first protrusion parts 153 protruding from the first surface 151 to the electrode assembly 110 and second protrusion parts 154 protruding from the second surface 152 to the terminal plate 140. In one embodiment, a distance between the second protrusion parts 154 is larger than a distance between the first protrusion parts 153. In one embodiment, the ball 156 is coupled to a space between the first protrusion parts 153 and the terminal plate 140 is coupled to a space between the second protrusion parts 154, which will further be described below.

The injection hole 155 includes a throughhole 155a centrally formed between the first protrusion parts 153 and a recess 155b formed in the second surface 152 and connected to the throughhole 155a. In one embodiment, a diameter of the throughhole 155a is larger than that of the recess 155b, so that an electrolyte solution can be easily injected therethrough.

The ball 156 is coupled to the throughhole 155a to then be fixed. The ball 156 may include, for example, a metal core and a resin coated on a surface of the metal core. The metal core may be, for example, aluminum, and the resin may be, for example, Teflon.

Therefore, when the ball 156 is coupled to the throughhole 155a, the throughhole 155a is sealed by the resin surrounding the metal core. Accordingly, the electrolyte solution may not leak to the outside through the throughhole 155a. In addition, since the resin does not react with the electrolyte solution, leakage of the electrolyte solution may be prevented even with the lapse of time. In such a manner, the injection hole 155 may be primarily sealed by the ball 156.

In one embodiment, the terminal plate 140 may include a plurality of bent regions, which will now be described in detail.

The terminal plate 140 includes a circularly planar first region 141 being in contact with a bottom surface of the recess 155b formed in the cap plate 150. The planar first region 141 contacts the bottom surface of the recess 155b, thereby preventing the ball 156 from deviating to the outside.

In addition, the terminal plate 140 includes a slanted second region 142 shaped of a circular ring upwardly extending from the first region 141 and being in contact with side surfaces of the recess 155b.

Further, the terminal plate 140 includes a planar third region 143 shaped of a circular ring extending from the second region 142 and being in contact with the second surface 152 of the cap plate 150.

The third region 143 may further include, for example, a welded region 143a. In other words, the third region 143 may further include the welded region 143a in which the third region 143 is welded and coupled to the first surface 151 of the cap plate 150. In such a manner, the injection hole 155 may be secondarily sealed by the welded region 143a.

The third region 143 may further include, for example, a welded region 143a. Specifically, the third region 143 may further include the welded region 143a in which the third region 143 is welded and coupled to the second surface 152 of the cap plate 150. In such a manner, the injection hole 155 may be secondarily sealed by the welded region 143a.

In addition, the terminal plate 140 includes a slanted fourth region 144 shaped of a circular ring upwardly extending away from the third region 143 and the second surface 152 of the cap plate 150. As described above, an external space 148 of the terminal plate 140 is defined by the first region 141, the second region 142, the third region 143, the welded region 143a and the fourth region 144. A welding tool may easily be locatable close to the third region 143 via the external space 148.

In addition, the terminal plate 140 includes a substantially rectangular fifth region 145 outwardly extending from the fourth region 144 and welded to a bus bar. The fifth region 145 is substantially parallel with the first surface 151 of the cap plate 150. In addition, since the bus bar is welded to the planar fifth region 145, a plurality of rechargeable batteries 100 may be connected in series or in parallel to one another.

In addition, the terminal plate 140 includes a planar sixth region 146 shaped of a substantially rectangular ring extending from the fifth region 145 and getting closer to the second surface 152 of the cap plate 150. Therefore, an internal space 149 of the terminal plate 140 is defined by the third region 143, the fourth region 144 and the fifth region 145, thereby reducing the overall weight of the terminal plate 140.

In addition, the terminal plate 140 includes a planar seventh region 147 extending from the sixth region 146 and being in contact with the second surface 152 of the cap plate 150. Moreover, grooves 147a may be formed in the seventh region 147 and the second protrusion parts 154 may be coupled to the grooves 147a. Additionally, since the seventh region 147 and the second protrusion parts 154 can be welded to each other, the terminal plate 140 can be more firmly fixed to the cap plate 150.

In one embodiment, the first to seventh regions 141 to 147 of the terminal plate 140 may have similar thicknesses or the same thickness and may be configured to be bent multiple times. In other words, the terminal plate 140 may have multiple bent sections, rather than a bulk section, so that the external space 148 and the internal space 149 may be provided. Therefore, the overall weight of the terminal plate 140 is reduced, the first region 141 contacts the bottom surface of the recess 155b, the second region 142 contacts the side surfaces of the recess 155b, and the third region 143 and the seventh region 147 contact the second surface 152 of the cap plate 150, thereby allowing the injection hole 155 to be triple sealed.

As described above, according to the present invention, the terminal plate 140 is coupled to the injection hole 155 of the cap plate 150, thereby providing the rechargeable battery 100 enabling triple sealing without a separate seal-pin and having the terminal plate 140 coupled to the injection hole 155 with an improved mechanical strength.

For example, the injection hole 155 is primarily sealed by the ball 156, secondarily sealed by the welded region 143a between the terminal plate 140 and the cap plate 150, and thirdly sealed by a contact region between the terminal plate 140 and the cap plate 150, thereby enabling triple sealing of the injection hole 155 and ultimately demonstrating improved sealing performance.

In addition, since the injection hole 155 is completely covered by the terminal plate 140, mechanical strength of the injection hole 155 can be increased. Moreover, since the injection hole 155 and the terminal plate 140 are formed to spatially overlap each other in a region, space utilization efficiency of the rechargeable battery can be improved.

FIGS. 3A to 3D are cross-sectional views illustrating an assembling method of a rechargeable battery according to an embodiment of the present invention.

Figure 3A:
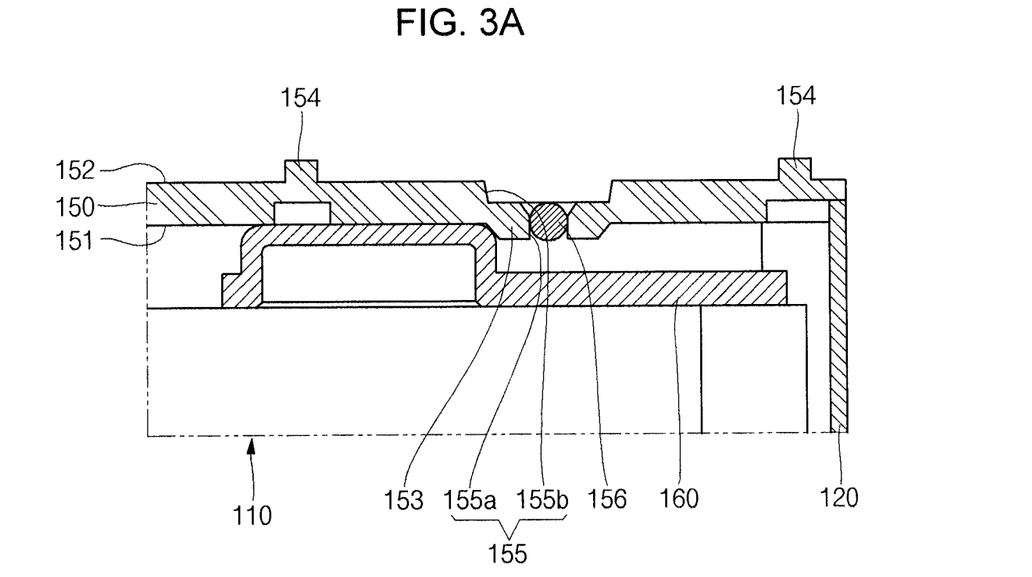
FIGS. 3A to 3D are cross-sectional views illustrating an assembling method of a rechargeable battery according to an embodiment of the present invention.

As illustrated in FIG. 3A, after an electrolyte solution is sufficiently injected into the case through the injection hole 155 provided in the cap plate 150, the ball 156 is coupled to the injection hole 155, thereby sealing the injection hole 155. In other words, as the ball 156 is coupled to the throughhole 155a of the injection hole 155 by a forcedly injection method or interference fit, the metal core and/or the resin constituting the ball 156 may be modified, thereby allowing the ball 156 to completely close the throughhole 155a. Accordingly, the injection hole 155 or the throughhole 155a is primarily sealed by the ball 156.

Figure 3B:
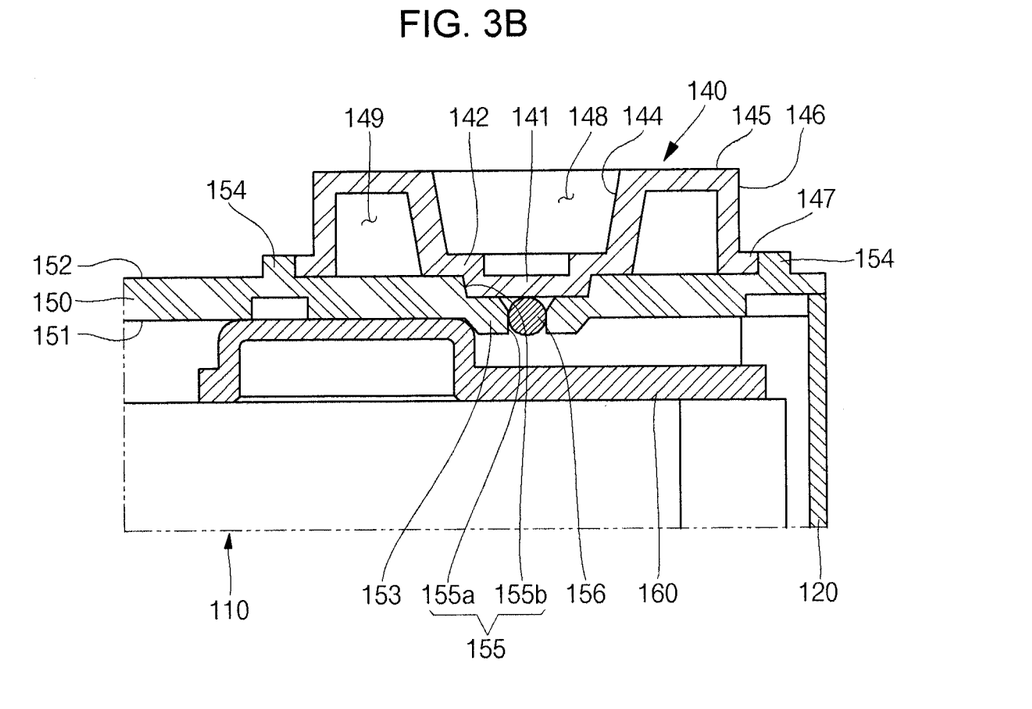

Further, as illustrated in FIG. 3B, the terminal plate 140 is mounted in the injection hole 155 provided in the cap plate 150. In one embodiment, the first region 141 of the terminal plate 140 is mounted on the bottom surface of the recess 155b of the injection hole 155 and on the ball 156, the second region 142 is mounted on the side surface of the recess 155b, and the third region 143 and the seventh region 147 are mounted on the second surface 152 of the cap plate 150. Moreover, the grooves 147a of the seventh region 147 and the second protrusion parts 154 of the cap plate 150 are coupled to each other.

Figure 3C:
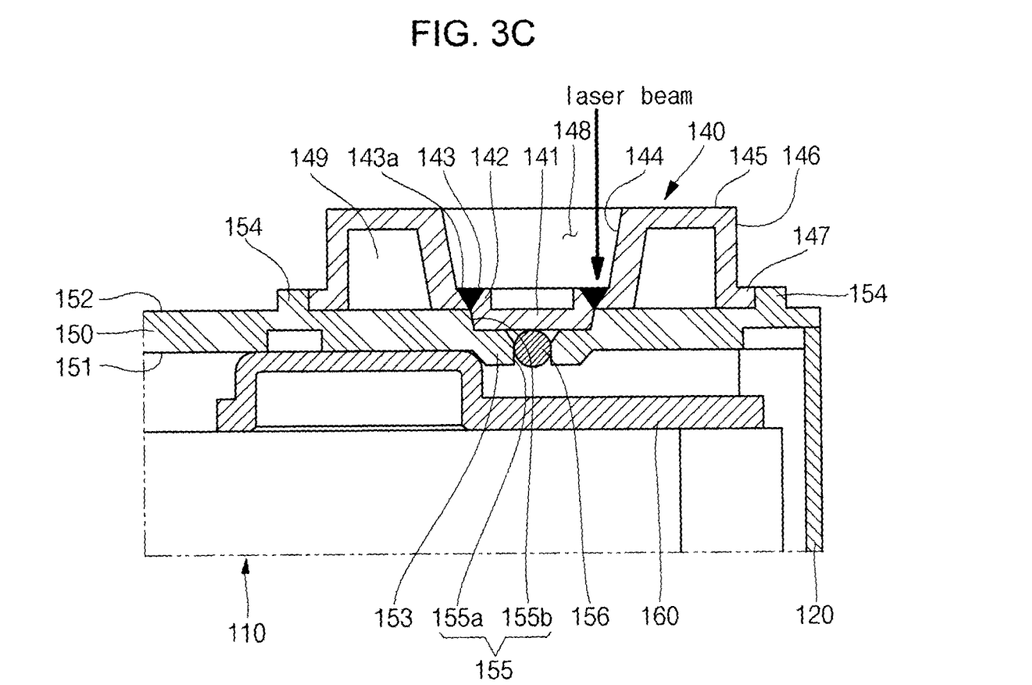

Next, as illustrated in FIG. 3C, the third region 143 of the terminal plate 140 is welded to the second surface 152 of the cap plate 150 by, for example, a laser beam. In one embodiment, since the third region 143 is shaped of a substantially circular plane, the welded region 143a subjected to a laser beam may also have a plane shaped of a substantially circular ring. Therefore, the injection hole 155 is secondarily sealed by the circular ring-shaped welded region 143a.

Moreover, since the third and seventh regions 143 and 147 of the terminal plate 140 contact the second surface 152 of the cap plate 150, the injection hole 155 may be thirdly sealed by the contact regions.

Figure 3D:
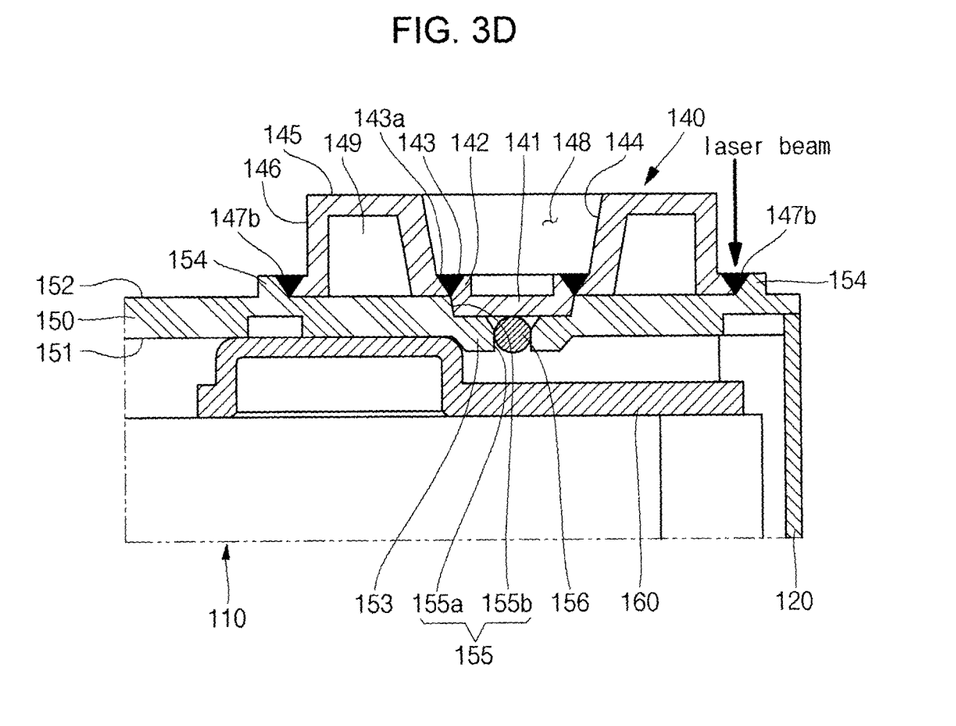

As illustrated in FIG. 3D, in some cases, the second protrusion parts 154 of the cap plate 150 and the seventh region 147 of the terminal plate 140 are welded to each other by laser beam, thereby forming another welded region 147b. A coupling force between the terminal plate 140 and the cap plate 150 can be further increased by the welded region 147b and sealing performance of the injection hole 155 can be further improved.

While the rechargeable battery of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rechargeable battery comprising:
an electrode assembly;
a case accommodating the electrode assembly;
a cap plate covering the case and having a first surface facing the electrode assembly and a second surface opposite the first surface, the cap plate including an injection hole extending from the first surface to the second surface and being sealed by a ball, the second surface having a recess depressed toward the first surface, the injection hole being arranged in the recess; and
a terminal plate covering the injection hole and the ball, the terminal plate including a first region in the recess below the second surface of the cap plate.

2. The rechargeable battery of claim 1, wherein the terminal plate is welded to a region of the cap plate outside the injection hole.

3. The rechargeable battery of claim 1, wherein the cap plate includes a first surface that is planar and faces the electrode assembly, a second surface that is planar, is located opposite to the first surface, and faces the terminal plate, a first protrusion part protruding from the first surface towards the electrode assembly, and a second protrusion part protruding from the second surface towards the terminal plate.

4. The rechargeable battery of claim 3, wherein the injection hole includes a throughhole centrally formed in the first protrusion part.

5. The rechargeable battery of claim 4, wherein the ball is coupled to the throughhole.

6. The rechargeable battery of claim 4, wherein the first region of the terminal plate is planar and contacts a bottom surface of the recess, and wherein the terminal plate further includes a slanted second region extending from the first region and contacting side surfaces of the recess, a planar third region extending from the second region and contacting the second surface of the cap plate, a slanted fourth region extending away from the third region and the second surface of the cap plate, a planar fifth region extending from the fourth region and welded to a bus bar, a planar sixth region extending from the fifth region and towards the second surface of the cap plate, and a planar seventh region extending from the sixth region and contacting the second surface of the cap plate.

7. The rechargeable battery of claim 6, wherein a groove is formed in the seventh region of the terminal plate and wherein the second protrusion part of the cap plate is coupled to the groove.

8. The rechargeable battery of claim 6, wherein the seventh region of the terminal plate is welded to the second protrusion part.

9. The rechargeable battery of claim 6, wherein the third region of the terminal plate is welded to one region of the second surface of the cap plate.

10. The rechargeable battery of claim 6, wherein a space is defined by the fourth, fifth, and sixth regions of the terminal plate.

11. The rechargeable battery of claim 1, wherein the ball comprises a metal core and a resin coated on a surface of the metal core.

* * * * *